US010021159B2

United States Patent
Zanger et al.

(10) Patent No.: US 10,021,159 B2
(45) Date of Patent: Jul. 10, 2018

(54) METHOD OF STABILIZED ADAPTIVE VIDEO STREAMING FOR HIGH DYNAMIC RANGE (HDR)

(71) Applicant: Giraffic Technologies Ltd., Tel-Aviv (IL)

(72) Inventors: Yoel Zanger, Tel-Aviv (IL); Offer Atzitz, Tel-Aviv (IL); Rotem Epelbaum, Ramat Gan (IL); Amir Raanan, Ramat Gan (IL)

(73) Assignee: Giraffic Technologies Ltd., Tel Aviv (IL)

( * ) Notice: Subject to any disclaimer, the term of this patent is extended or adjusted under 35 U.S.C. 154(b) by 0 days.

(21) Appl. No.: 15/595,991

(22) Filed: May 16, 2017

(65) Prior Publication Data

US 2017/0346871 A1    Nov. 30, 2017

(30) Foreign Application Priority Data

May 25, 2016    (IL) .......................................... 245860

(51) Int. Cl.
*H04L 29/06*    (2006.01)
*H04N 21/44*    (2011.01)

(52) U.S. Cl.
CPC ........ *H04L 65/602* (2013.01); *H04L 65/4092* (2013.01); *H04L 65/80* (2013.01); *H04N 21/44004* (2013.01)

(58) Field of Classification Search
CPC ................ H04L 65/4092; H04L 65/80; H04N 21/44004
See application file for complete search history.

(56) References Cited

U.S. PATENT DOCUMENTS

| 9,306,860 | B2 | 4/2016 | Zanger et al. | |
| 2006/0083315 | A1* | 4/2006 | Sato | H04H 60/12 375/240.25 |
| 2013/0227158 | A1* | 8/2013 | Miller | H04L 65/60 709/231 |

* cited by examiner

*Primary Examiner* — Suraj Joshi
(74) *Attorney, Agent, or Firm* — Manelli Selter PLLC; Edward J. Stemberger (57) ABSTRACT

An adaptive video streaming stabilization system includes a computer network comprising a data source; a video player; and a session controller connected between the data source and an adaptive streaming stabilizer. The session controller is configured to use in parallel a variable number of streams in order to maximize download throughput from the data source to the video player. The adaptive streaming stabilizer is connected between the video player and the session controller.

1 Claim, 7 Drawing Sheets

METHOD OF STABILIZED ADAPTIVE VIDEO STREAMING FOR HIGH DYNAMIC RANGE (HDR)

TECHNICAL FIELD

The present invention relates to the field of Internet, and more particularly, to improving HDR adaptive video streaming display (also known as ABR—Adaptive Bit Rates) in such networks.

CROSS-REFERENCE TO RELATED PATENT APPLICATIONS

This patent application claims priority from and is related to Israeli Patent Application Ser. No. 245860, filed May 25, 2016, this Israeli Patent Application incorporated by reference in its entirety herein.

BACKGROUND

A common problem encountered by many internet users is video re-buffering pauses during playback, or with content services using Adaptive Streaming Protocols (HLS, MPEG-DASH, etc.)—low quality of video viewing experience.

These Adaptive Streaming Protocols avoid video re-buffering by automatically reducing the video streaming bitrate (and subsequent quality/resolution) of the video, so that less data and bandwidth is required to stream the video.

Two main problems that harm the end user's viewing experience are mediocre video quality and frequent quality changes due to internet bandwidth congestion, which are especially visible to the human eye in video streams of High Dynamic Range (HDR) content.

The video players on devices or websites try to solve these issues by collecting a buffer of data and measuring this data's download speed in order to try to determine quality changes that may be required. Fluctuating network/communication link conditions may cause network bursts. This behavior can cause rapid bitrate (quality) changes.

These changes degrade the overall user experience and should be avoided.

U.S. Pat. No. 2013/0227158 describes a control unit which includes a determiner and a requestor. The determiner is configured to determine media-data rate in response to the network throughput and one of multiple fill ranges to which a level of a buffer corresponds, and the requestor is configured to request a media-file segment having the determined media-data rate. For example, such a control unit may be able to control the streaming of a video file in a way that reduces or prevents buffer underflows (i.e., video "freezes"), reduces the start-up delay, and that reduces the frequency of changes from one quality level (e.g., resolution) to another quality level, while streaming the highest-quality version of the video file that the data throughput allows.

There is need for a method that guarantees stabilizing the video quality by controlling the quality changes and gradually decreasing or increasing the adaptive video bitrate. The method guarantees minimal quality changes in order to avoid sharp decreases in quality while providing the highest possible quality for better viewing experience.

SUMMARY

According to an aspect of the present embodiment there is provided an adaptive video streaming stabilization system comprising: a computer network comprising a data source; a video player; and a session controller connected between the data source and an adaptive streaming stabilizer, the session controller configured to use in parallel a variable number of streams in order to maximize download throughput from the data source to the video player; the adaptive streaming stabilizer connected between the video player and the session controller, wherein the adaptive streaming stabilizer is configured to: receive a request from the video player to download an adaptive video stream in a specified quality; download fragments of the specified quality into a buffer and upload the fragments from the buffer to the video player at a rate that will not cause the player to request lower or higher quality; wait for a pre-determined time before starting a stabilization process; and start a stabilization process which comprises maximizing the rate of the download of current quality fragments and if the rate of the download is slower than expected gradually decreasing the adaptive video quality.

The gradually decreasing may comprise downloading fragments of the previous lower quality into a second buffer and uploading the fragments to the video player from the second buffer if the video player requests the previous lower quality and the second buffer is full enough.

The gradually decreasing may further comprise slowing down the upload rate of current quality fragments to be at a rate required for causing the video player to request a previous lower quality.

According to another aspect of the present embodiment there is provided a method of adaptive video streaming stabilization comprising: receiving from a video player a request for an adaptive video stream to be downloaded in a specified quality; downloading fragments of the specified quality into a buffer and uploading the fragments to the video player from the buffer at a rate that will not cause the player to request lower or higher quality; and after a pre-determined time has elapsed—starting a stabilization process; wherein the stabilization process comprises maximizing the rate of the download of current quality fragments and if the download rate is slower than expected gradually decreasing the adaptive video quality.

The gradually decreasing may comprise downloading fragments of the previous lower quality into a second buffer and uploading the fragments to the video player from the second buffer if the video player requests the previous lower quality and the second buffer is full enough.

The gradually decreasing may further comprise slowing down the upload rate of current quality fragments to be at a rate required for causing the video player to request a previous lower quality.

BRIEF DESCRIPTION OF THE DRAWINGS

For better understanding of the invention and to show how the same may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF THE INVENTION

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

In High Dynamic Range (HDR) the dynamic range of an image is the difference in brightness between the lightest and darkest areas of the image. Human eyes, for example, can handle much wider ranges of brightness than conventional cameras and can adjust to sudden changes in light much more quickly. In general, a high dynamic range video can be generated by taking frames of a video captured at alternating long and short exposures (or multiple cameras with different exposure levels filming the same scene) over time and producing HDR video from these frames.

Dynamic range is often measured in "stops", which is the logarithm (base 2) of the contrast ratio (the ratio of the luminance of the brightest color, white, to that of the darkest color, black, that the system is capable of producing). The human eye can see up to about 14 stops. Standard dynamic range consumer television (8 bit video, e.g. DVD, SD and HD DVB) supports about 6 stops of dynamic range. HDR, using 10 (or more) bit video, is able to reach a higher dynamic range than the human eye can notice.

Media with HDR requires higher bandwidth for the overhead (approximately 20% more), and since each change in video quality will be felt by the viewer more sharply, staying at a steady quality has higher priority than even providing higher quality.

By monitoring the video player's media requests for HDR file formats, based on the request's metadata, a stabilizer of the present invention applies an algorithm for maintaining the quality that will be stable and as high as possible.

By monitoring the real-time state of the network, the stabilizer can predict degradation in network bandwidth, download a lower stream quality and shape the network bandwidth to match the download speed of the network. The video player should notice the changes in download speed and request the lower quality that the stabilizer guides it to download.

While HDR improves the image, it also has a flaw; images are so sharp and real that they are more sensitive to changes. A drop in quality is much more visible and can have negative effects on the quality of experience.

The present invention overcomes this flaw by guaranteeing stabilization of the video quality by controlling the bitrate (and subsequent quality) changes and gradually decreasing or increasing the adaptive video bitrate (quality). The method guarantees minimal quality changes in order to avoid sharp decreases in quality while providing the highest possible quality for better watching experience.

This goal is achieved by:

Shaping the network bursts and predicting the next quality, thus guaranteeing high quality video with minimal quality changes, using real-time analytics of the communication line and shaping the playback within the video player.

Maximizing download speed for a given internet connection, thus guaranteeing that the video player displays the highest quality possible at minimal quality changes.

Figure 1:
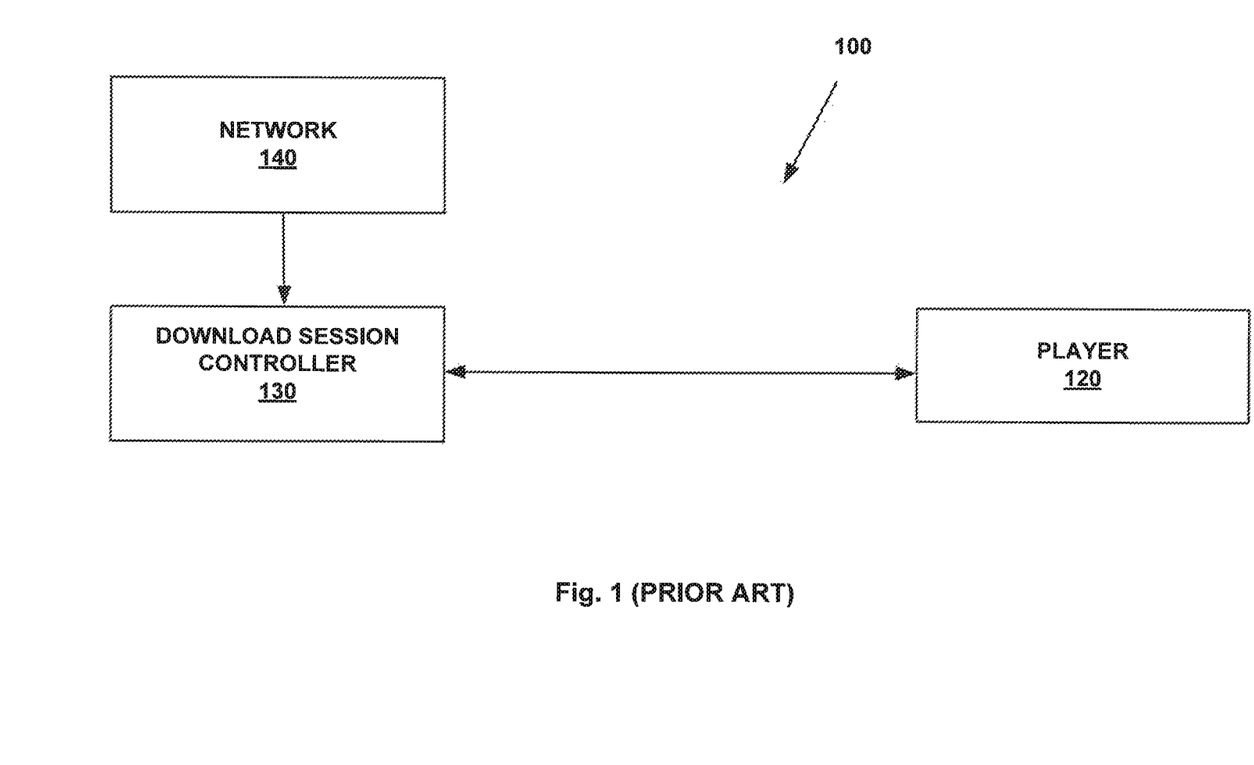
FIG. 1 is a schematic block diagram of a prior-art adaptive video streaming system.

FIG. 1 is a schematic block diagram of a prior-art adaptive video streaming system 100, as described in U.S. Pat. No. 9,306,860 B2, comprising a computer network (data source) 140, a video player 120 and an intermediate session controller 130. The session controller 130 provides a general mechanism independent of the content being downloaded or its play rate that uses in parallel a variable number of streams in order to maximize the link throughput at any time.

Figure 2:
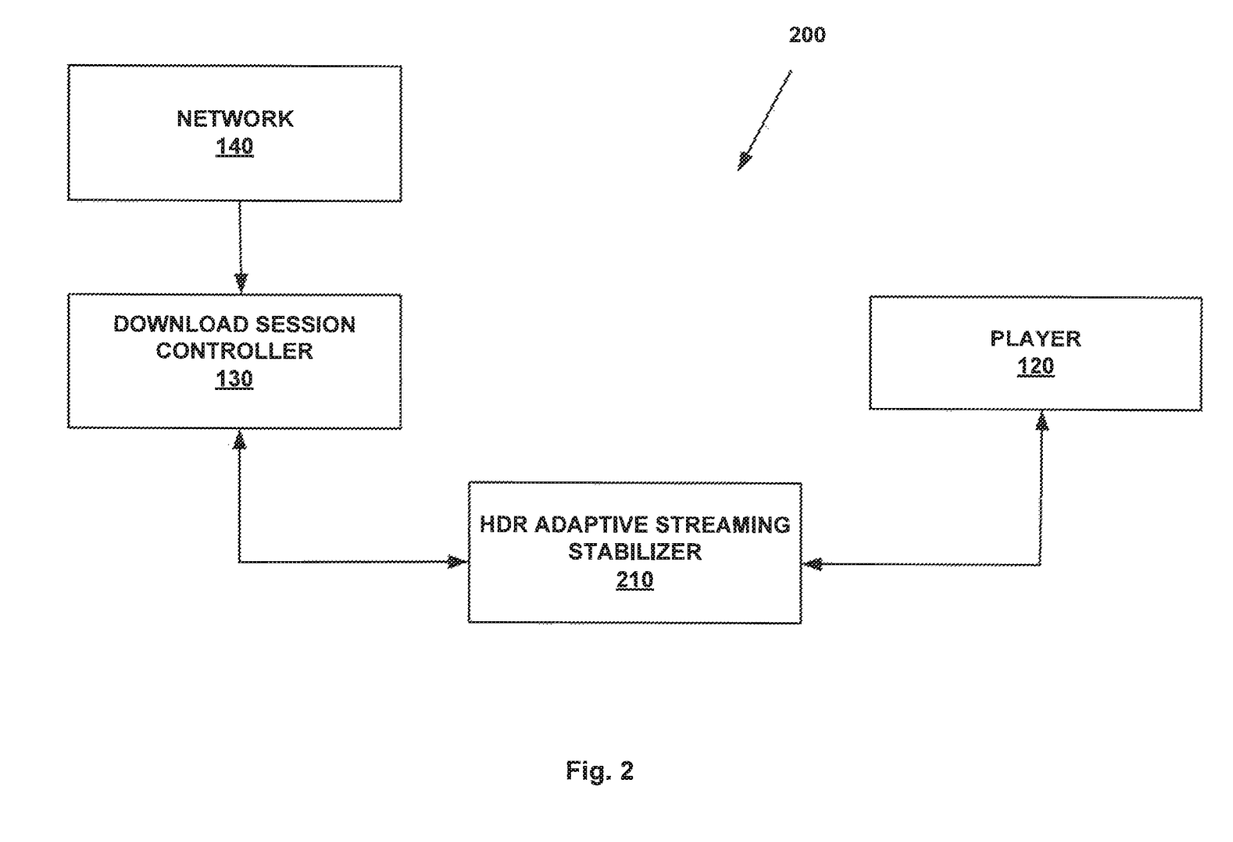
FIG. 2 is a schematic block diagram of an exemplary HDR adaptive video streaming system according to embodiments of the present invention.

FIG. 2 is a schematic block diagram of an exemplary adaptive video streaming system 200 according to embodiments of the present invention, additionally comprising a High Dynamic Range (HDR) adaptive streaming stabilizer 210, for shaping the network bursts and predicting the next quality to be request by the player 120, thus guaranteeing high quality video with minimal quality changes, avoiding sharp decreases in quality and determining the downloaded fragments accordingly.

In adaptive streaming, each stream of a given quality is built from fragments, so the player can switch to a different stream quality between fragments.

In order to accelerate Adaptive Presentations—the system has to download fragments BEFORE the player requests them.

In order to do that—the system has to know which streams are available in the presentation, their relations, and the fragments of each individual streams.

This information is found in the Manifest file of the presentation.

The video player also needs to know this metadata—so it asks for it in order to play.

According to the present invention, the manifest request is intercepted by the stabilizer 210, e.g. by a device system level integration or by an Internet browser proxy auto-config (PAC), the response is parsed, the URL of the stream source is replaced with the URL of the stabilizer 210 and the modified version of the manifest is returned to the player 120.

Figure 3:
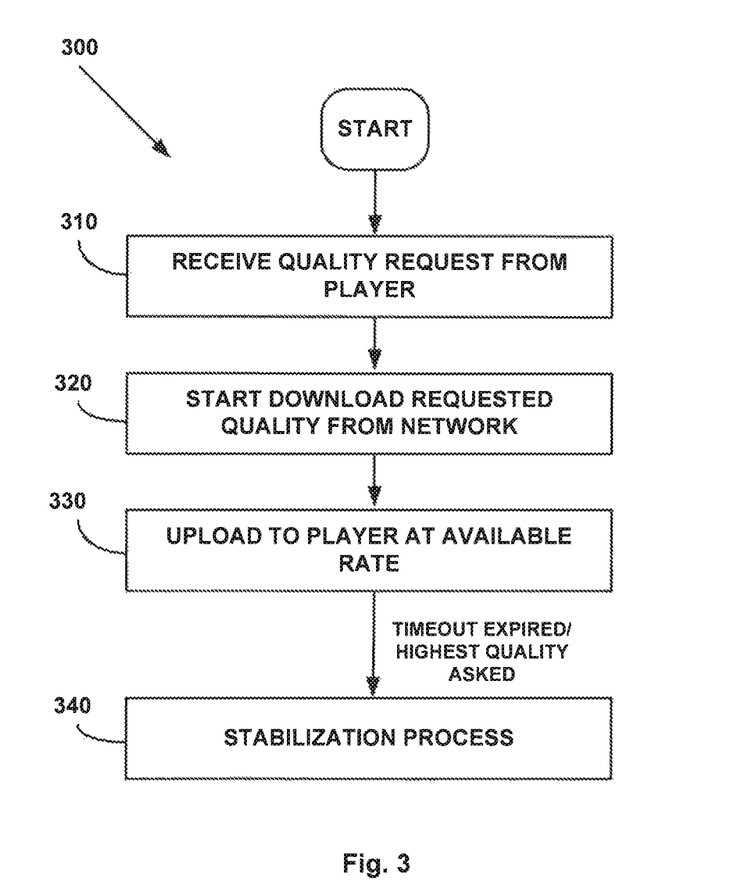
FIG. 3 is a general flowchart showing the processing performed by the HDR adaptive streaming stabilizer according to embodiments of the present invention.

FIG. 3 is a general flowchart 300 showing the processing performed by the HDR adaptive streaming stabilizer 210 according to embodiments of the present invention.

In step 310 the stabilizer 210 receives from the player a request for an HDR adaptive video stream to be downloaded. The player specifies the required quality.

In steps 320 and 330 the stabilizer starts downloading fragments of the requested quality and uploading them to the player at a rate that will not cause the player to request lower or higher quality.

At this stage no stabilization is done yet, to allow the stabilizer enough time for its startup procedure.

Figure 4A:
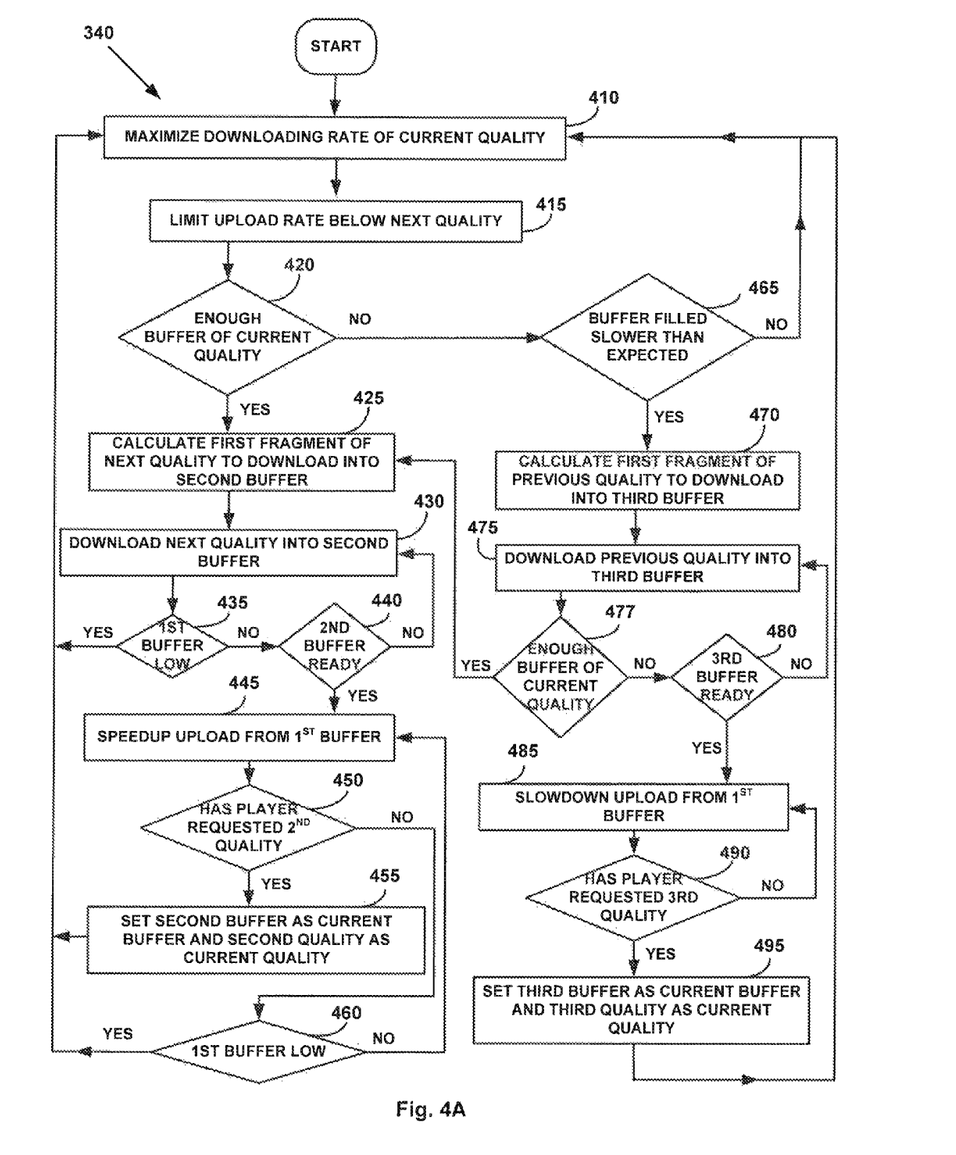
FIG. 4A is a detailed flowchart showing the stabilization process performed by the HDR adaptive streaming stabilizer according to embodiments of the present invention.

In step 340, once the startup time has expired or the highest quality is asked by the player, the stabilizer begins performing the stabilization process, as will be detailed below in conjunction with FIG. 4.

The stabilization process may end:

If the player requests different quality than expected, in which case the stabilizer goes back to step 310 where the player controls the download quality and rate;

By reaching the end of the video stream.

FIG. 4A is a detailed flowchart showing the stabilization process 340 performed by the HDR adaptive streaming stabilizer 210 according to embodiments of the present invention.

In step 410 the process continues the download of the current quality fragments at the maximal rate and at the same time limits the upload rate to be just below the rate required for the next (higher) quality (step 415). In step 420 the process checks whether the current quality buffer is full, or has at least enough data to provide to the player till the next quality buffer is ready for uploading.

The calculation involves:
a. Time required for downloading the next quality buffer;
b. Time the player requires to transfer to the next quality once it receives higher rate of data;
c. Time required for reverting to the current quality if the next buffer is not filled in the expected time.

If the current quality buffer is full or full enough, in step 425 the process calculates which fragment of the next quality should be downloaded. The calculation takes into consideration how long it will take to have enough data in the new quality buffer to start uploading from it.

In step 430, the process starts downloading fragments into the second quality buffer according to the previous calculation.

In step 435, the process checks whether the first buffer, from which upload to the player is currently being done, is too low to sustain the player in the current quality. If it is, the process returns to step 410 to continue downloading the current quality. Otherwise, if the first buffer is full enough, the process checks (step 440) whether the second buffer is ready, i.e. is full enough to start uploading the second quality to the player. If not—downloading into the second buffer continues in step 430.

If the second quality buffer is found to be full enough—upload from the current (first) buffer to the player is speeded up (step 445), in order to cause the player to request the second (higher) quality.

In step 450, the process checks whether, as expected, the player has requested the second quality. If it has—the buffers are switched, namely the second quality buffer is set as the current buffer and the second quality is set as the current quality (step 455), thus increasing the quality of data sent to the player.

The process then returns to step 410 to try and further improve the data quality.

Otherwise, if no request for the second quality has been received from the player after having speeded up the upload, the process checks again whether the first buffer, from which upload to the player is currently being done, is too low to sustain the player in the current quality (step 460). If it is, the process returns to step 410 to continue downloading the current quality. Otherwise, the upload speedup process continues in step 445. Back to step 420, if the calculation indicates no possibility for quality enhancement, in step 465 the process checks whether the current quality buffer is filled slower than expected (e.g. not enough bandwidth—slow download rate). If it is not, the process returns to step 410. If it is, in step 470 the process calculates which fragment of the previous (lower) quality should be downloaded. The calculation takes into consideration how long it will take to have enough data in the new quality buffer to start uploading from it.

In step 475, the process starts downloading the previous (lower) quality fragments into the third (lower) quality buffer according to the previous calculation. In step 477 the process checks whether the current quality buffer has enough data to provide to the player (e.g. the network's conditions were improved). If it has, the process returns to step 425. If it has not, in step 480, the process checks whether the third buffer is ready, i.e. is full enough to start uploading the third quality to the player. If not—downloading into the third buffer continues in step 475.

If the third quality buffer is found to be full enough—upload from the current (first) buffer to the player is slowed down (step 485), in order to cause the player to request the third (lower) quality.

In step 490, the process checks whether, as expected, the player has requested the third quality. If it has—the buffers are switched, namely the third quality buffer is set as the current buffer and the third quality is set as the current quality (step 495), thus decreasing the quality of data sent to the player.

The process then returns to step 410 in order to try to improve the data quality.

Otherwise, if no request for the third quality has been received from the player after having slowed down the upload, the upload slowdown process continues in step 485.

According to embodiments of the invention, at any stage of the process, if the player requests different quality than expected, the process returns to step 310 of FIG. 3.

Figure 4B:
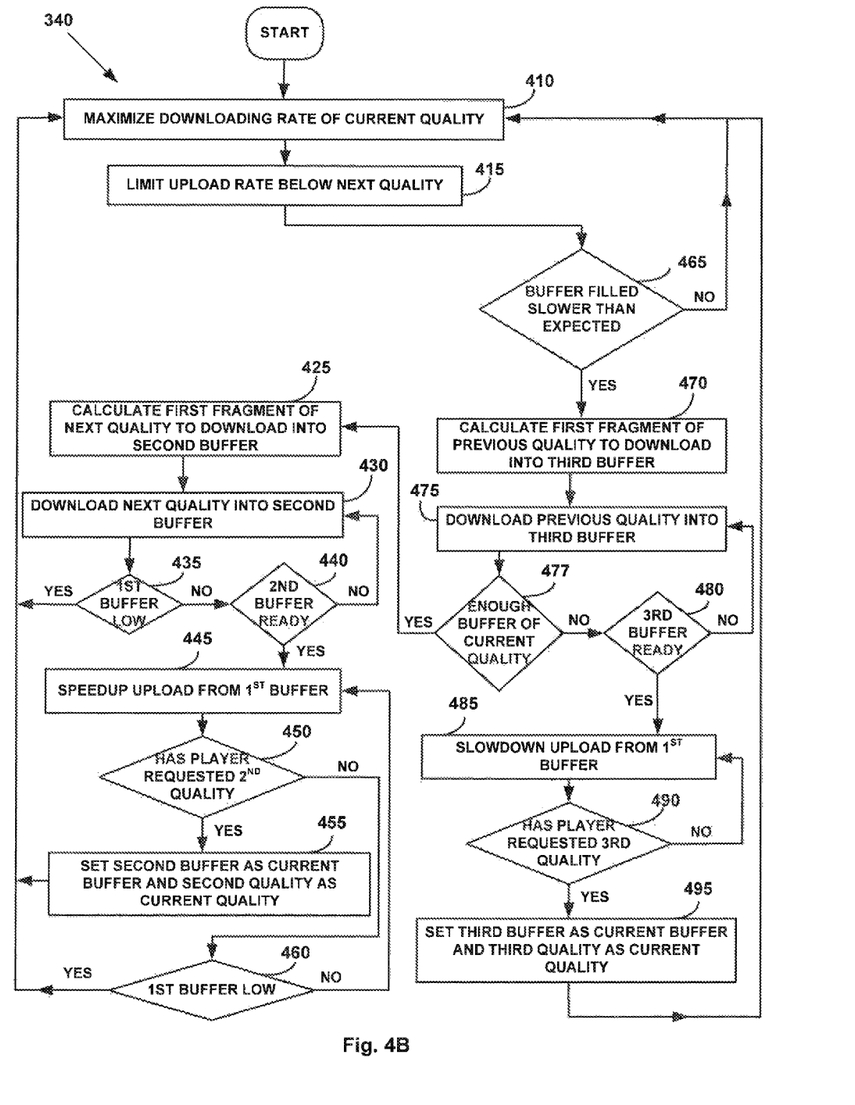
FIG. 4B is a detailed flowchart showing another stabilization process performed by the HDR adaptive streaming stabilizer according to embodiments of the present invention.

FIG. 4B is a detailed flowchart showing another stabilization process 340 performed by the HDR adaptive streaming stabilizer 210 according to embodiments of the present invention. As can be seen, the process is almost similar to the process described in conjunction with FIG. 4A except that step 420 has been deleted and the process continues from step 415 directly to step 465.

According to embodiments of the invention, at any stage of the process, if the player requests different quality than expected, the process returns to step 310 of FIG. 3.

Figure 4C:
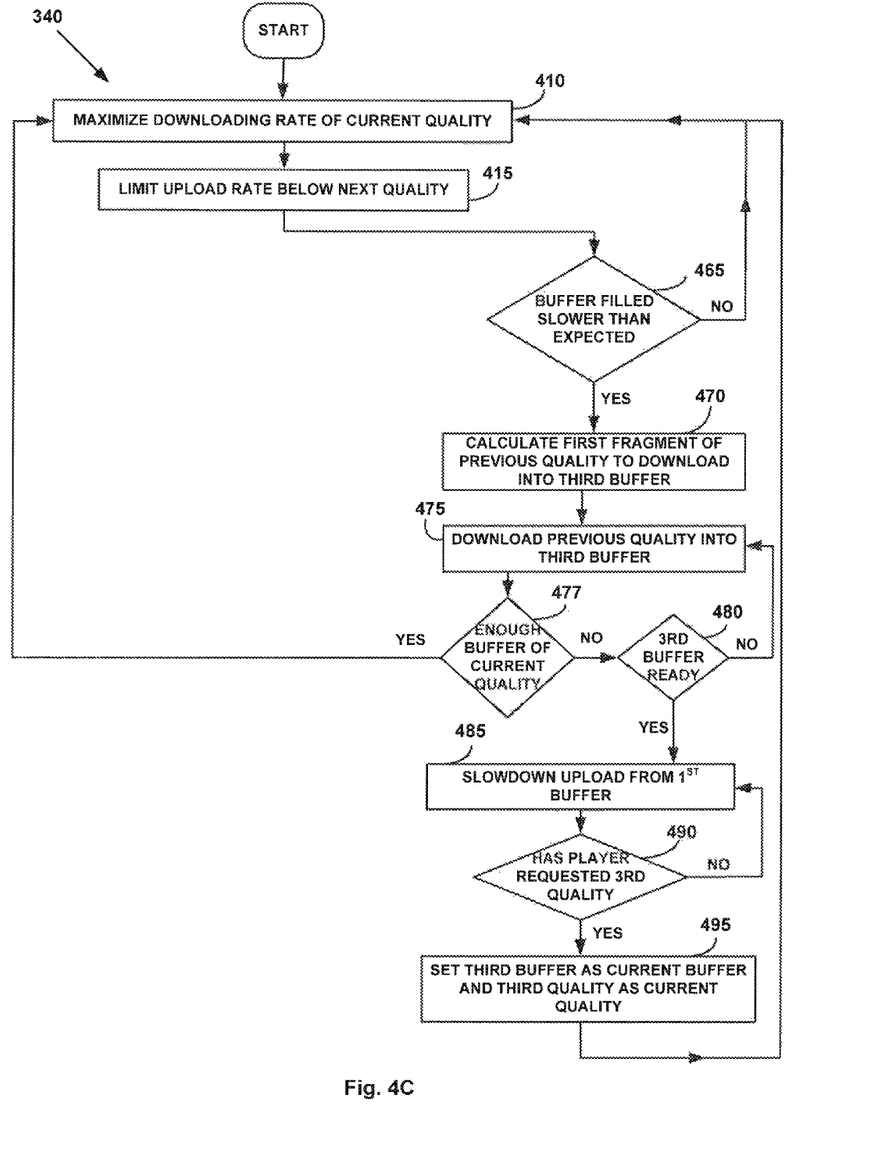
FIG. 4C is a detailed flowchart showing another stabilization process performed by the HDR adaptive streaming stabilizer according to embodiments of the present invention.

FIG. 4C is a detailed flowchart showing another stabilization process 340 performed by the HDR adaptive streaming stabilizer 210 according to embodiments of the present invention. As can be seen, steps 420-460 have been deleted, the process continues from step 415 directly to step 465 and the "Yes" option of step 477 returns to step 410. According to this embodiment, the process only gradually decreases the video quality (if necessary).

According to embodiments of the invention, at any stage of the process, if the player requests different quality than expected, the process returns to step 310 of FIG. 3.

It will be appreciated that the present invention is not limited to HDR format and any other known format, such as, for example, Standard Dynamic Range (SDR) may be stabilized by the system of the present invention.

Figure 5:
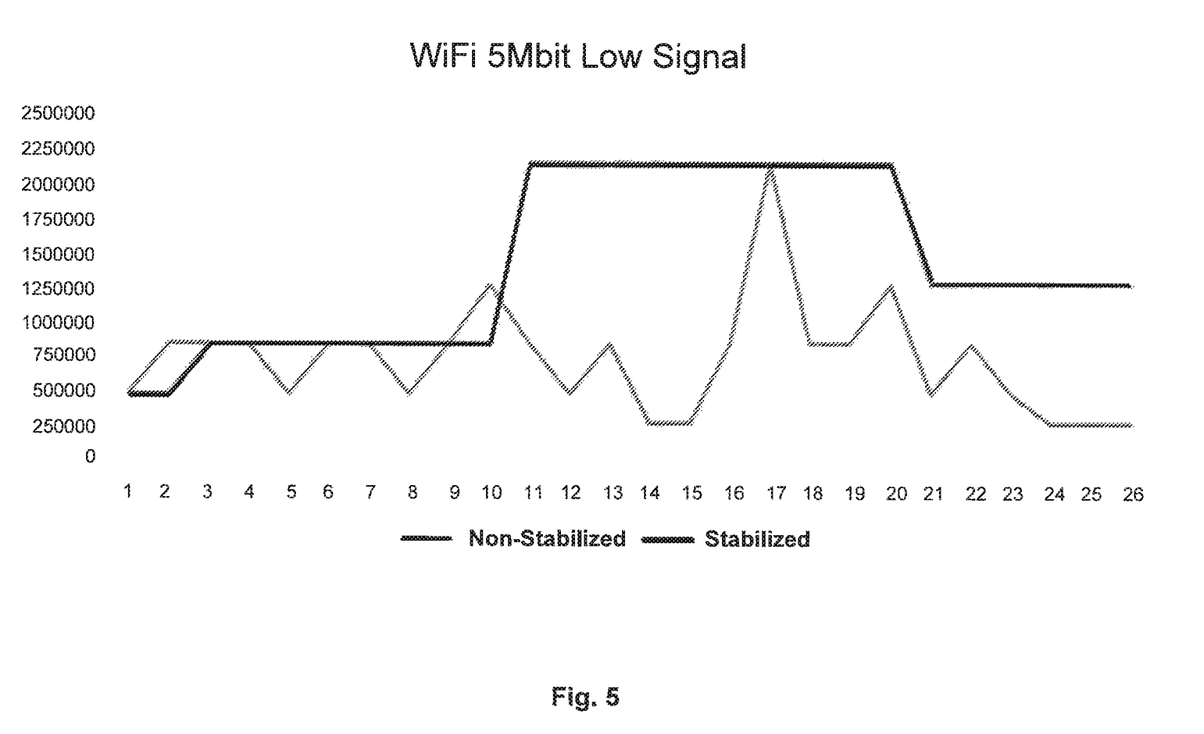
FIG. 5 is a graph showing empirical results of using the stabilization according to the present invention.

FIG. 5 is a graph showing empirical results of using the stabilization according to the present invention, showing a stable high quality as compared to the prior art non-stabilized method.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof which would occur to persons skilled in the art upon reading the foregoing description.

The invention claimed is:

1. A method of adaptive video streaming stabilization comprising:
   receiving from a video player a request for an adaptive video stream to be downloaded in a specified quality;
   downloading fragments of said specified quality into a buffer and uploading said fragments to said video player from said buffer at a rate that will not cause said player to request lower or higher quality; and
   after a pre-determined time has elapsed starting a stabilization process;
   wherein said stabilization process comprises maximizing the download rate of current quality fragments by using variable number of streams and limiting the upload rate of current quality fragments to be at a rate that will not cause said player to request lower or higher quality; downloading fragments of the previous lower quality into a second buffer before said video player requests them; and if the download rate is lower than the rate required for downloading said current quality fragments: slowing down said upload rate of current quality fragments to be at a rate required for causing said video player to request a previous lower quality; and uploading fragments to said video player from said second buffer if said video player requests said previous lower quality and said second buffer is full enough.

* * * * *